Fig.: 1

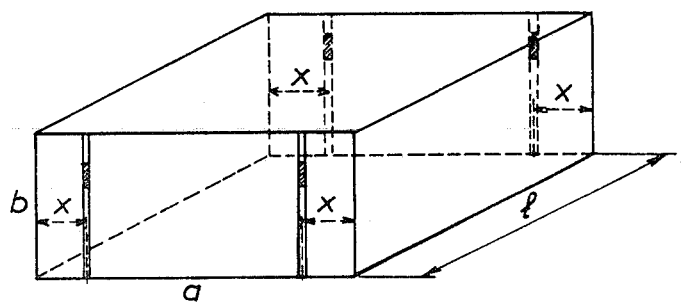
Fig.:7
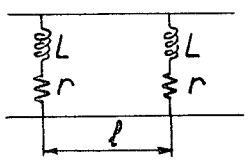
Fig.:7a
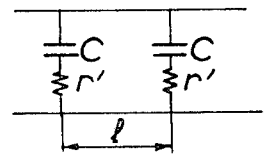
Fig.:7b
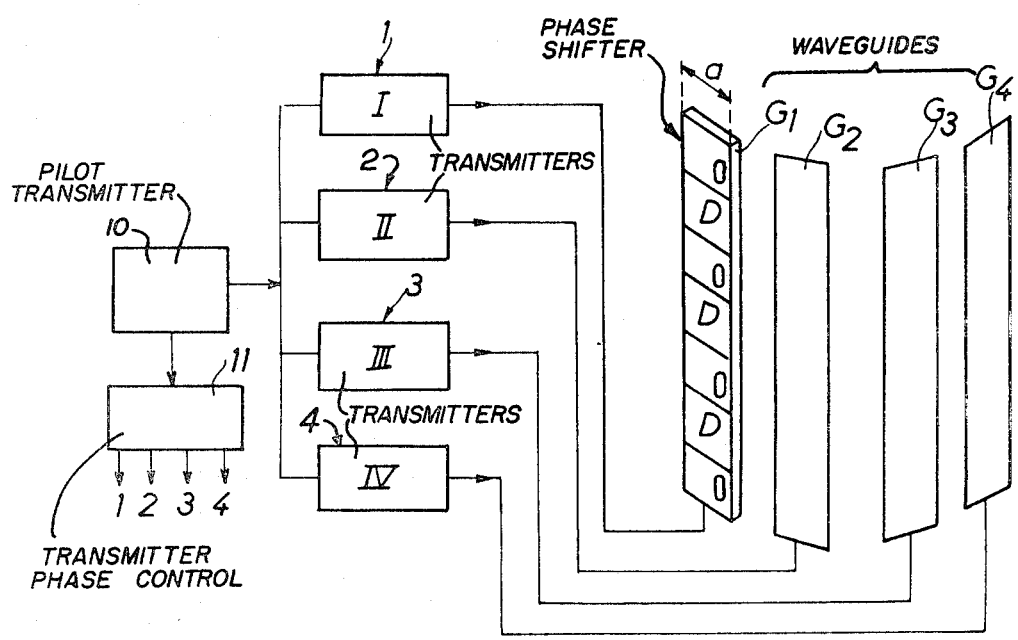
Fig.:8

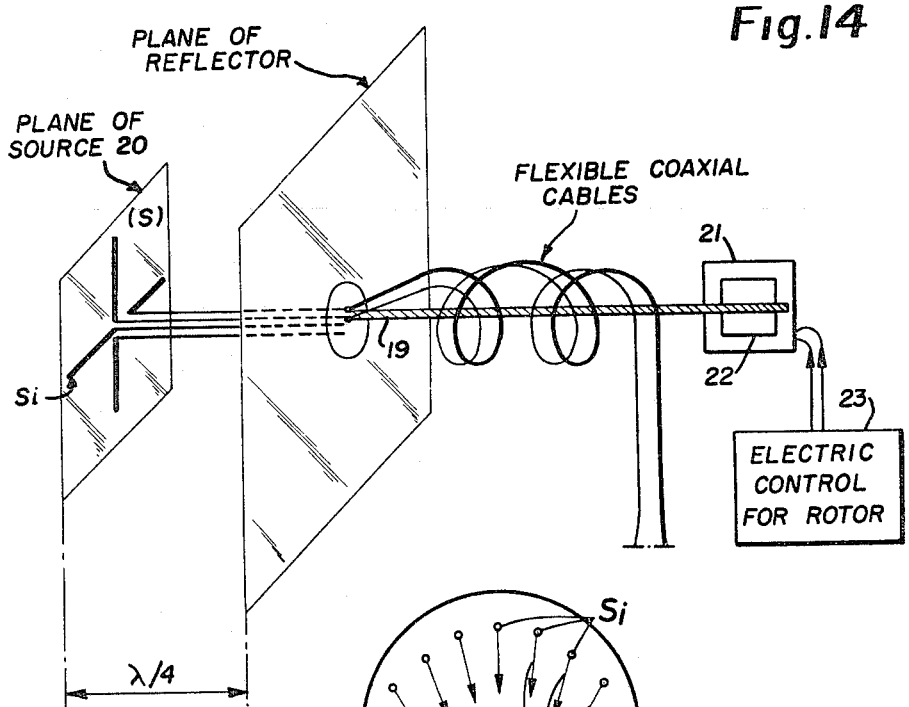
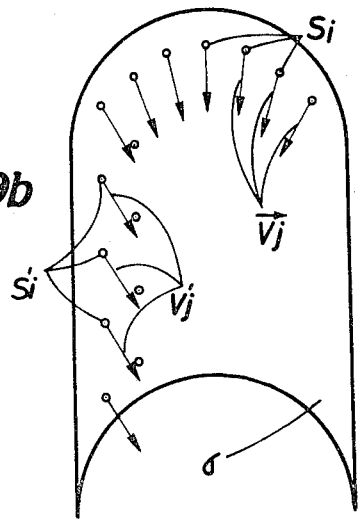
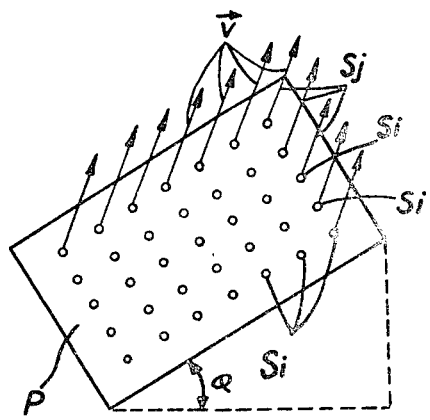
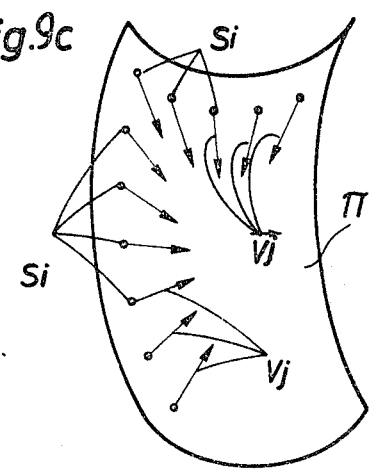

United States Patent Office 3,560,975
Patented Feb. 2, 1971

3,560,975
AIRCRAFT ANTENNA SYSTEM FOR AERIAL NAVIGATION
Bertrand Claude Marcel Jean Manuali, Villiers-sur-Orge, France, assignor to Centre National d'Etudes Spatiales, Paris, France, a company of France
Filed Mar. 1, 1968, Ser. No. 709,764
Claims priority, application France, Mar. 2, 1967, 97,202; Mar. 30, 1967, 100,850; July 27, 1967, 115,934
Int. Cl. B64g *3/00*
U.S. Cl. 343—100                    7 Claims

ABSTRACT OF THE DISCLOSURE

An antenna array for use in an aircraft, adapted to allow navigation to be effected by reference to two fixed points in space which may be outside the earth's atmosphere, comprising two dual lateral antennas, one dual antenna for each side of the aircraft, each antenna incorporating a transmission section and a receiving section, which sections are fixed relative to the aircraft, means being provided whereby the radio beams emitted (and received) by said antennas are capable of orientation by virtue of electronic scanning techniques, towards the respective fixed points of reference.

---

This invention relates to an aircraft antenna array, the array being designed to implement a spatial aerial navigation method based upon the continuous or periodic plotting of the aircraft's position (i.e., the tracking of the aircraft) in relation to two points fixed in space, which points may be located outside the earth's atmosphere.

Preferably, the two points in question will be constituted by two stationary satellites separated from one another by a constant known longitudinal angle. In relation to an airfield from which the aircraft takes off, one of these satellites for example, may have a westerly longitude of 10°, whilst the other may have a westerly longitude of 60°. Under these circumstances, the array of associated antennas which forms the subject of the invention must provide permanent or intermittent communication with the two satellites. Its "coverage" should be such that it is easy and straightforward to use, in particular over the North Atlantic say, in both directions of transit; it should also be amenable to easy adaptation to a global assembly of navigational satellites and serial navigational aids, so that it is effective in any part of the world.

To this end, the invention provides a dual lateral transmitting/receiving antenna, i.e. dual reciprocal antenna, at either side of the aircraft fuselage, the functions of transmission and reception being switchable from one antenna to the other in accordance with the heading the aircraft is flying. Each lateral antenna is associated with two radio beams with identical characteristics, the one a transmitted beam, the other a beam which is received after reflection from a satellite, and each antenna is designed to operate in the "aircraft band," that is to say the band between 1540 and 1660 mc./s. The antennas are of the "electronic-scan" type, that is to say they alter their lobe position in relation to the aircraft; a rotary mechanical antenna would inevitably be heavier and larger in size. Finally, each antenna must have a gain of between 10 and 15 decibels and should be effective whatever the latitude in which the aircraft is operating.

In the accompanying drawings:

FIG. 1 illustrates a number of examples of routes taken by an aircraft flying in particular from London to New York or vice versa using two stationary satellites $S_1$ and $S_2$ separated from one another by a longitudinal angle of 50°. In this drawing, it has been assumed that the two satellites $S_1$ and $S_2$ are moving in the equatorial plane of the earth and that their orbital time is exactly equivalent to the time taken for the earth to complete one revolution about its own axis, so that it is then possible at all points on the surface of the earth to consider the satellites as fixed points (stationary satellites). The curve A represents an outward and return route. The family of curves U indicates the successive azimuths of the satellite $S_1$, viewed from the aircraft, and the family of curves V indicates the successive elevations of the same satellite, likewise seen from the aircraft, at different points on the route. It goes without saying that similar families of curves can be plotted in advance for the satellite $S_2$, but these have been omitted from FIG. 1 simply to avoid confusion and to keep the illustration clear.

As already mentioned, the antenna array in accordance with the invention comprises two dual lateral antennas or two reciprocal lateral antennas located at port and starboard sides of the aircraft. These antennas are designed for two identical radio beams, one of which is transmitted by the aircraft and the other of which is received by the aircraft after reflection from a satellite, and are of the electronic-scan type. Although the antennas are fixed in relation to the aircraft, the beam (or lobe) of each antenna can be displaced in azimuth and in elevation due to the employment of a scanning technique. To this end, each sub-array, which constitutes a lateral antenna, is made up of two identical sections, namely $B_1$ and $B_2$ at the port side and $T_1$ and $T_2$ at the starboard side. Each of these sections is constituted by a certain number Q of radiators arranged upon a defined surface, a flat surface for example, in a grid pattern of $n$ rows and $m$ columns, giving a total of $Q = n \times m$ radiators. These radiators are either of the circularly polarised kind (radiating spirals or slots, or dipoles crossed at 90° for example), or linearly polarised (straight and parallel dipoles or slots). The directional beam which results from this, being produced by feeding the Q radiators co-phasally with the same amplitude throughout, has an axis perpendicular to the common plane of the radiators or coincidental with the mean position of the normal to the surface carrying said radiators where said surface is, for example, part of a cylinder.

The said axis may be deflected by retaining the same amplitude distribution between all the sources but modifying the phase distribution among them. If the radio beam is to be deflected in azimuth (this is the case where the flight path flown is virtually at constant latitude), the phases of the $m$ columns of radiators are modified in relation to one another in accordance with a linear law which is a function of their spacing and the desired angle of deflection. If the radio beam is to be deflected in elevation (this is the case where the flight path flown varies in altitude, or during turns or flattening out after a descent), the phases of the $n$ rows of radiators are modified in relation to one another in accordance with a similar linear law. This phase distribution can be achieved using one or more phase-shift elements of any known kind, or using any known means which will produce this same effect.

Since, as already mentioned, the axis of the radio beam produced by the simultaneous action of Q elementary radiators when same are fed co-phasally, coincides with the mean normal to the surface carrying the said radiators, and since when the radiators are fed out of phase with one another, said axis is deflected in relation to said normal, it will be understood how important it can be, in determining the direction of the said beam, correctly to design the said supporting surface.

Each sub-array, $B_1$ or $B_2$ at the port side, $T_1$ or $T_2$ at the starboard side, is constituted by the arrangement of $Q=m \times n$ elementary radiators on a flat or curved panel which follows the shape of part of the selected surface. Thus, each lateral antenna is constituted by the juxtaposition of two virtually identical panels, preferably located side by side or in extension of one another.

In order to form these panels, although in principle part of any desired surface can in fact be used, the invention provides particularly for the use of a flat portion, this representing the simplest solution available albeit not the best one, for the use of a cylindrical surface, this being the simplest of the curved surfaces, and finally for the use of a surface of double curvature, the sphere and the ellipsoid being special cases. For this reason, in the following, an embodiment on a flat surface, one on a cylindrical surface and one on a toroidal surface are described.

The ensuing description relating to the accompanying further drawings will indicate by way of a non-limitative example how the invention may be carried into practice.

In the drawings:

FIG. 2 schematically illustrates a simple embodiment of sub-array such as $B_1$, $B_2$, $T_1$ or $T_2$, on a flat panel, four of which identical arrangements (or arrangements which are symmetrical in pairs) form an antenna array of the kind proposed in accordance with the invention;

FIG. 3 indicates the azimuthal scanning angles for an antenna array covering the two opposite sides of an aircraft;

FIGS. 4a and 4b illustrate the positions of the aircraft in relation to the marker satellites, as viewed from the aircraft and at any point on the flight path;

FIG. 5 schematically illustrates, in schematic manner, the structure of a sub-array such as $B_1$, here in the form of $m$ waveguides each provided with $n$ elementary radiators in the form of slots formed in the waveguide walls;

FIGS. 6a, 6b and 6c respectively illustrate several possible arrangements of the radiator slots in relation to the waveguide wall and in relation to the longitudinal axis of the waveguide;

FIG. 7 shows a phase-shift element located inside a waveguide, whilst FIGS. 7a and 7b shows electrical circuit diagrams equivalent to this phase-shift element;

FIG. 8 is a diagram showing the H.F. power supply to a sub-array such as $B_1$;

Figure 10:
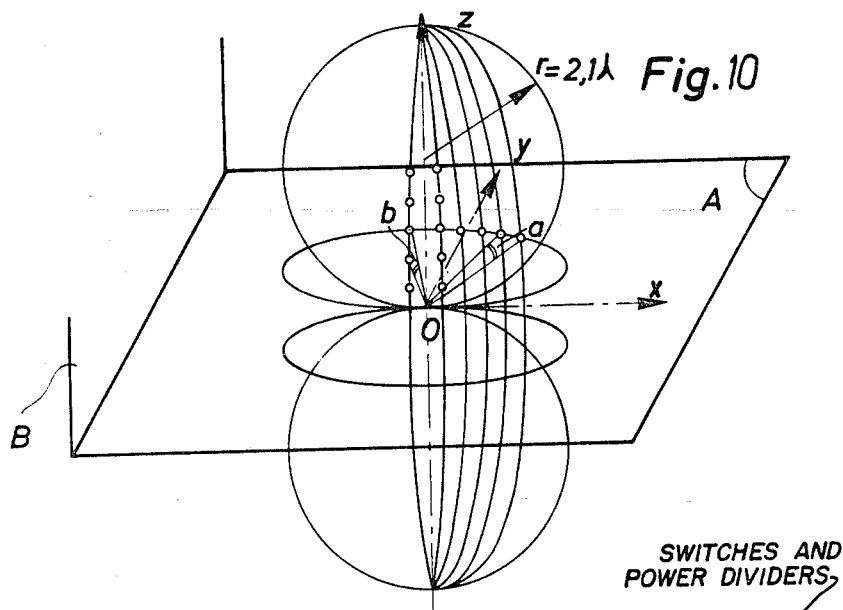
Figure 11:
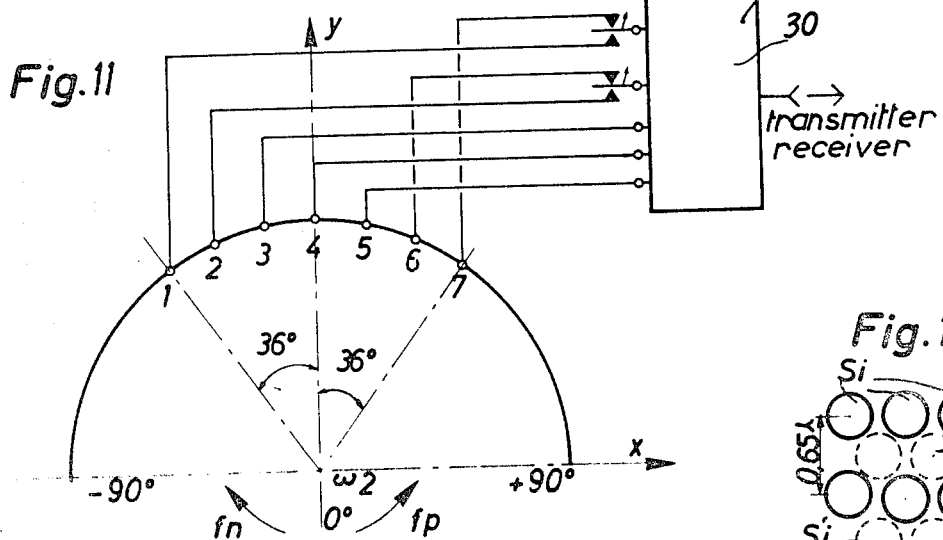
Figure 13:
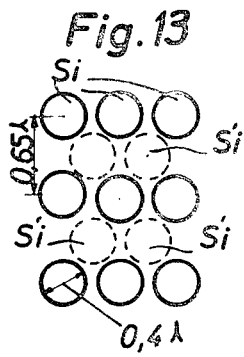
Figure 12:
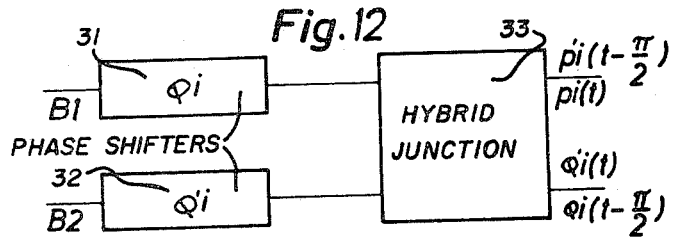
Figure 12A:
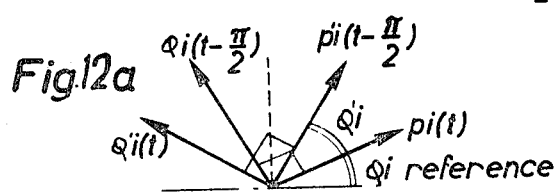

FIGS. 9a to 9c are diagrams for explaining the convergence or non-convergence of the directions of principal radiation from the different elementary radiators in accordance with the shape of their mounting surface, 9a indicating a flat mounting surface, 9b a cylindrical mounting surface, and 9c a toroidal mounting surface; these figures are self-explanatory and require no further discussion, the directions of principal radiation of the said radiators or the axes of the different fractions of elementary radiation being indicated by vectors V extending from the radiators;

FIG. 10 illustrates the arrangement of the radiators on a portion (suitably selected) of a toroidal surface;

FIG. 11 illustrates the equatorial plane of this surface, which is that of a torus in which the generating circle (which describes the toroidal surface by rotation about its axis of revolution) has the radius $r=2.85\lambda$ whilst its radius of gyration, being the locus of the centres of all right sections in the equatorial plane of the torus, has double this radius $R=2r$ (torus with closed aperture), $\lambda$ being the wavelength of the radiation from the elementary radiators;

FIG. 12 is the diagram of an arrangement which enables two opposite directions of polarisation to be imparted to two radio beams associated with one and the same lateral antenna ($B_1$ and $B_2$ utilise the same radiators, as do $T_1$ and $T_2$), whilst FIG. 12a is the vector diagram corresponding to the arrangement of FIG. 12;

FIG. 13 shows how the radiators $S_1$ of $B_1$ or $T_1$ can be made to overlap with the radiators $S'_1$ of $B_2$ or $T_2$, in order to produce a complete lateral antenna system on one and the same toroidal panel; and FIG. 14 illustrates the use of a miniature servomotor.

Figure 2:
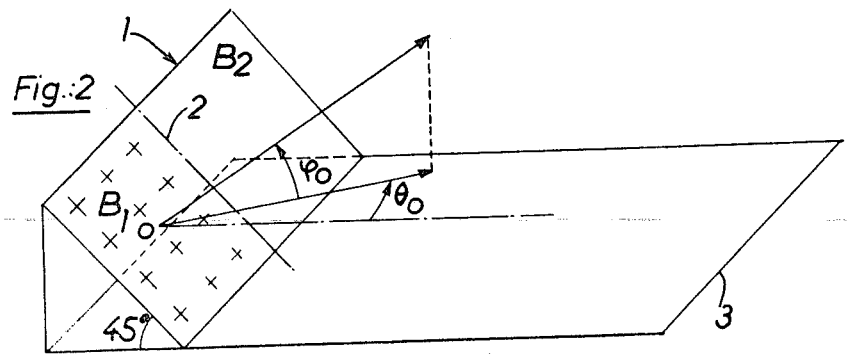

We refer first to FIG. 2, which schematically illustrates a first embodiment of a lateral antenna system in accordance with the invention.

As this figure shows, this antenna which, as already mentioned, incorporates two sub-arrays $B_1$ and $B_2$ (or $T_1$ and $T_2$), comprises a flat panel 1 divided into two parts $B_1$ and $B_2$, for example by a central line 2. Each of the said parts is equipped with Q elementary radiators represented by crosses $(+)$ in the figure. The radiators are arranged in the grid pattern illustrated, forming 4 columns and 3 rows, i.e. 12 elementary radiators per sections $B_1$ or $B_2$, the two sections being identical. The different sources can be constituted, in particular, by coils with a small number of turns (two or three), by crossed radiator slots (on a carefully selected portion of a surface), by radiator slots formed in a rectangular waveguide in a zone thereof in which the polarisation is appropriate (circular or elliptical), or by other known means; it must be borne in mind in all cases that it is necessary for the radiation pattern of each radiator to have very little directivity so that a large tolerance is possible on the general direction of the radio beam resulting from the combined action of all the radiators on a given panel.

It goes without saying (referring back to FIG. 1) that each satellite $S_1$ and $S_2$ should be capable of being reached by the radio beams emitted by the antenna arrays in the aircraft, whatever the aircraft's position along the flight path; this means that although the antennas themselves are static, the radio beams which they emit should be capable of virtually instantaneous displacement either in azimuth or in elevation. In order to facilitate this operation, the plane of the panel 1 (or the mean tangential plane of the relevant portion of the surface) is inclined at an angle of 45° in relation to the plane 3, namely the horizontal plane of the aircraft when in level flight at constant altitude. This angle of 45° has been marked in FIG. 2, as have also the angle $\phi_0$ and $\theta_0$, which are respectively the elevational and azimuthal angles of the axis of the radio beam.

Figure 3:
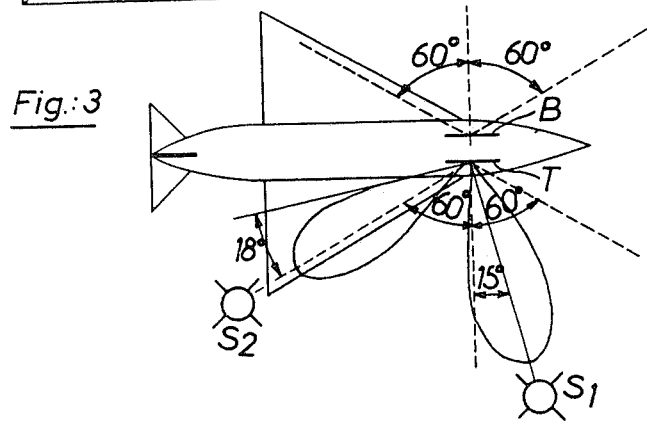

The assembly of the two lateral antenna systems, B on the port side and T on the starboard side, in the fuselage of an aircraft, has been schematically illustrated in FIG. 3, the marker satellites $S_1$ and $S_2$ likewise being shown (they are shown in positions considerably closer to the aircraft, considered along the lines of sight from the aircraft, than they would in fact occupy). FIG. 3 also illustrates what angles have to be considered in order to be able to precisely determine the azimuth of each satellite, and what are the exact values of these angles.

Figure 4A:
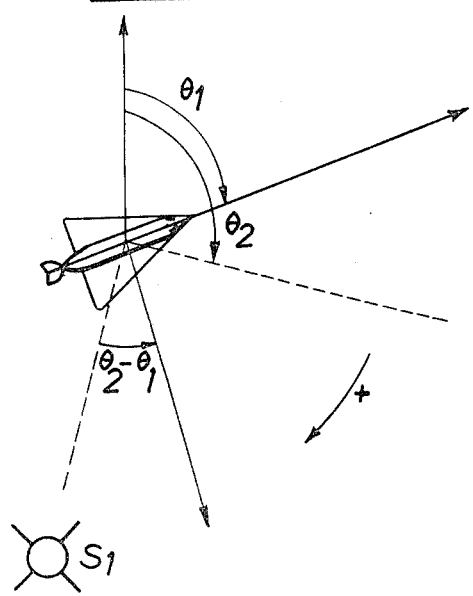
Figure 4B:
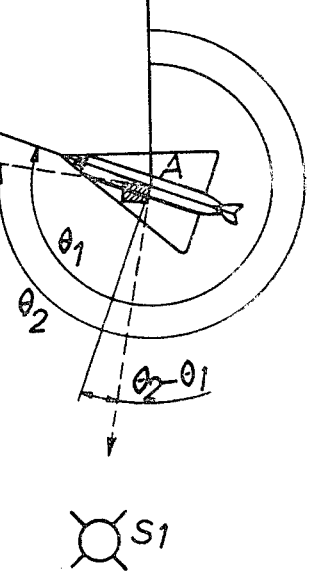

FIG. 3 is complementary to FIGS. 4a and 4b, which show a single satellite, $S_1$ in this example, and relate to the two directions of travel along an air route. FIGS. 4a and 4b show how the electronic-scan function must move the radio beam of one lateral antenna half, through an angle of $$\theta = \theta_2 - \theta_1$$

in relation to the pitch axis of the aircraft; in this expression, $\theta_1$ designates the azimuth of the aircraft, whilst $\theta_2$ designates the azimuth of the line perpendicular to the line joining aircraft and satellite.

Figure 1:
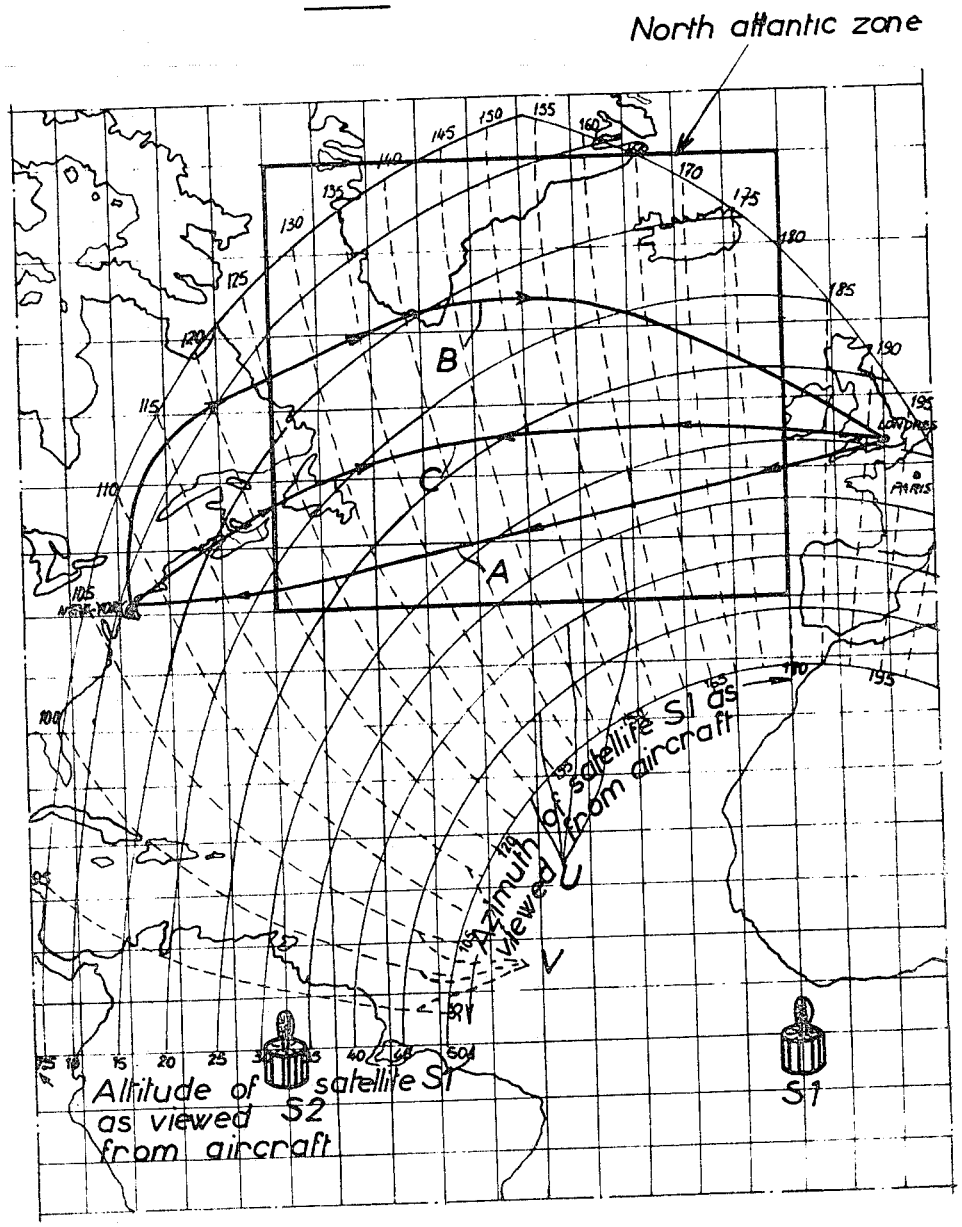

The fixed position of each satellite being a known factor, the curves U and V of FIG. 1 make it possible to prepare in advance a table of successive azimuths and elevations of a satellite, for the various positions of the aircraft along the flight path, thus facilitating the navigator's work. The table of azimuths, for example, shows that the maximum sweep of the radio beam will enable it to reach the satellite in question after passing through an angle of +75° in relation to the pitch axis of the aircraft. In fact, each antenna of the aircraft has an azimuthal coverage of 150° and this, with a beam angle of ±18°, corresponds to a maximum sweep or offset of about 60° considering the beam axis. This is shown in FIG. 3.

For controlling the elevational angle of the radio beam axis, the invention uses adjustment in successive steps of about 10° each. Considering a given route, this means that a more highly directional beam can be used, without the need for switching.

As an indication, we can say that, in practice, a simple antenna in accordance with the invention, $B_1$ or $T_1$ for example as schematically illustrated in FIG. 2, i.e. in the form of elementary radiators arranged on a flat panel, could be constituted by a 70 x 40 cm. panel 5 cm. in thickness. An antenna of this kind and size is easy to accommodate in the radome housing the meteorological radar antenna of the aircraft.

Owing to its high gain, aircraft-satellite links of high reliability and good quality can be established with the above described antenna. It also makes it possible:

To reduce the area of that part of the aircraft which is radio-transparent (the randome) and which is located in front of said antenna; and compared with a mechanically movable antenna, the surface area of the radome can be reduced in a proportion of greater than 2, for beam sweep angles of ±60°;

To give the beam a sweep of ±75°, whilst in addition radiating a not inconsiderable part of the energy through an angle of ±90;

To avoid signal attenuation in propagation, due to "multipath transmission" effects.

In accordance with a second embodiment of the invention (see FIG. 5), a lateral sub-array $B_1$ (or $T_1$) for example, comprises four rectangular-section waveguides, $G_1$, $G_2$, $G_3$ and $G_4$ respectively. Each of these waveguides is provided, on one of its faces, with four radiating slots $\sigma_1$ to $\sigma_4$, designated respectively by the notation of $\sigma_j{}^i$, signifying "radiator $j$ of waveguide $i$." All those faces of the waveguides which contain slots $\sigma$, are designed to lie on a cylindrical surface $\Sigma$, in such a way that those edges of the said waveguides which delimit the said faces extend along generatrices of said surface $\Sigma$. All the slots $\sigma_4$ are fed without any phase shift. On the other hand, between the slots $\sigma_4$ and $\sigma_3$, there is a phase-shift element $D^1$, between the slots $\sigma_3$ and $\sigma_2$ a phase-shift element $D^2$ and, finally, between the slots $\sigma_2$ and $\sigma_1$, a phase-shift element $D^3$. The four waveguides $G_1$ to $G_4$ are supplied with radio frequency power from a general source E through the medium of a power-divider P which feeds a quarter of the available power into each waveguide; the individual power quarters pass through phase-shift elements $D_1$ to $D_4$ individual to each waveguide. The function of each group of phase-shift elements $D_1$ to $D_4$, on the one hand, and $D_1{}^1$ to $D_4{}^3$ on the other, will be later discussed.

The curvature of the surface $\Sigma$ on which the various radiators $\sigma_1{}^1$ to $\sigma_4{}^4$ are distributed, obviously depends upon the angle $v$ (FIG. 5) which can be selected anywhere between 0 and 90° (0° corresponding to a flat arrangement). In practice, $v$ will be selected between 60 and 90° in order to obtain a good elliptical ratio in the antenna, throughout a large solid angle.

Preferably, in the embodiment under discussion, a "reciprocal" antenna has been provided, that is to say one which can be used for both transmission and reception. The frequencies involved are those of the "aircraft band" (1540 to 1660 mc./s.), mentioned earlier, the maximum interval between the transmission frequency $Fe$ and the receiving frequency $Fr$ being 7.5% of the centre frequency $Fc$ of the band, where $Fc=1600$ mc./s.

The power supplied by the transmitter is equally divided between the four waveguides and then undergoes phase shifts of $\phi_1$, $\phi_2$, $\phi_3$, $\phi_4$ in the four phase-shift elements $D_1$, $D_2$, $D_3$, $D_4$. These phase-shift elements enable the beam, which is the resultant of the energy provided by all the radiators, to be deflected in azimuth; they thus define the angle $\alpha$ between the mean normal N to the surface $\Sigma$ carrying the $Q=m \times n$ radiators, and the horizontal projection of the axis of the resultant beam.

After passing through these four phase-shift elements, the power enters four identical waveguides $G_1$ to $G_4$, in which the waves successively pass to the four radiating slots $\sigma_1$ to $\sigma_4$, with respective phase shifts of $\phi_1{}^1$ to $\phi_4{}^4$ such that the elevational attitude of the axis of the resultant beam is in the direction $\overrightarrow{OF}$ (elevation angle $\beta$). The twelve phase-shift elements $D_1{}^1$ to $D_4{}^4$ are identical and the phase shifts produced by each of them are also identical; they can be commonly controlled.

In order to ensure that each slot radiates the same power, despite the fact that the power is tapped off a little at a time, the coupling between the slots and the waveguide becomes tighter and tighter with progressing distance along the inside of the waveguide.

The polarisation of the emitted wave may, in particular, approach the circular, even for beam sweep angles of 60° in relation to the normal $\overrightarrow{ON}$. This effect is produced on the one hand by providing slots which are inclined in relation to the longitudinal axis of the waveguides (the inclination may vary from one slot to the next), and on the other hand, as already mentioned, by arranging the waveguides on a cylindrical surface $\Sigma$ (instead of a flat one), in the manner shown in FIG. 5.

Figure 6A:
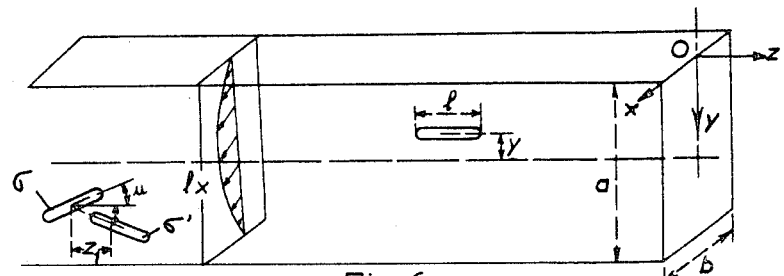

FIG. 6a, which illustrates a section of a rectangular waveguide, shows two possible arrangements of inclined slots $\sigma$ and $\sigma'$; this figure also shows how the energy is propagated inside the waveguide. It will be realised that, for an arrangement of three to eight radiators, the directivity is maximum when the distance $d$ between two radiators is approximately $0.7\lambda$ to $0.8\lambda$, where $\lambda$ is the wavelength.

It is also a known fact that the maximum sweep $\theta_m$ of the radio beam, and the distance $d$ between radiators, must satisfy the condition:

$$d \leq \frac{\lambda}{1+\sin \theta_m}$$

This makes it possible to avoid power loss as a consequence of secondary lobes in the radiation pattern of the beam.

Thus, in order to allow a sweep $\theta_m$ of virtually 90°, it is necessary for the distance $d$ between two radiators to be $0.5\lambda$. In fact, the secondary lobes, which are referred to as recombination lobes, only take any appreciable part of the power when $d > 0.8\lambda$ or $0.9\lambda$.

In order to satisfy the two foregoing conditions, therefore, radiators (the slots $\sigma_1{}^1$ to $\sigma_4{}^4$, see FIG. 5) which are spaced at $0.5\lambda$ to $0.9\lambda$, are used. For the case where there are four radiating slots, which we will assume to be isotropic and to be phased in the direction $\theta_0$, the field is proportional to:

$$E(\theta) = 2 \cos\left[\frac{k^d}{2}(\sin \theta - \sin \theta_0)\right] + 2 \cos\left[3\frac{k^d}{2}(\sin \theta - \sin \theta_0)\right]$$

where $k = 2\pi/\lambda$.

Since $\phi$ is the angle of incidence of the wave on the internal walls of the waveguide, it can be shown that the wavelengths in the waveguide, in the directions $Oz$ and $Oy$, are given by the following equations where the wave is a $TEo^1$ wave;

$$\lambda z = \frac{\lambda}{\cos \phi} \qquad (2)$$

$$\lambda y = \frac{\lambda}{\sin \phi} = 2a \qquad (3)$$

where:

$$b < \frac{\lambda}{2} < a < \lambda$$

Equation 3 shows that at a given wavelength λ, in free space, there is a single corresponding angle φ if we fix the dimension a of the waveguide. Moreover, the wavelength λz, which is referred to as the guided wavelength, is also fixed in this way.

On the other hand, if the guide is filled with a dielectric having a relative permittivity of ε, the Equations 2 and 3 become:

$$\lambda z = \frac{\lambda}{\sqrt{\epsilon} \sin \phi} \quad (2)$$

$$\lambda y = \frac{\lambda}{\sqrt{\epsilon} \sin \phi} = 2a \quad (3)$$

The result is that ε can be chosen so as to regulate the interval d between radiators and thus affect the directivity of the beam and the value of the maximum sweep $\theta_m$.

A data sheet published in "The Microwave Engineers' Handbook," Horizon House Incorporated, enables us to determine the characteristics of the slots. The invention also envisages the use of two inclined slots, e.g. σ or σ' (FIG. 6a), in order to constitute each elliptically polarised elementary radiator. However, in the following, a single longitudinal slot will be shown in order to simplify the drawings.

Figure 6B:
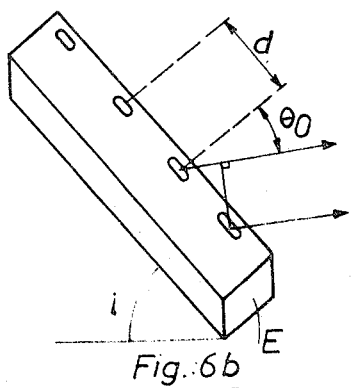
Figure 6C:
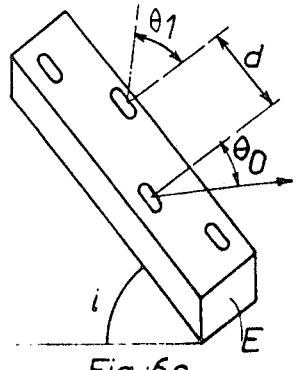

FIGS. 6b and 6c show two possible arrangements of slots in relation to the longitudinal axis of the waveguide.

The arrangement of the elementary radiators (slots), in a given waveguide of the antenna, should be such as to form the radiation pattern in the vertical plane and enable it to be deflected between elevational angles of +5° and +90°.

If we continue with a consideration of the example in which n=4 (although some other value of n such as 5 or 6 may be used for example), then the beam width is around 30° at 3 decibels maximum gain. In these circumstances, the extreme positions of the beam axis are around +15° and +80°.

By inclining the waveguide at an angle i close to 45° (we will assume that i=45° in calculations), it is possible to select the interval d between the slots in such a way that without introducing any phase-shift through the medium of the phase-shift elements, the axis of the beam is inclined at 15° to the horizontal. Thus, in order that the radiation from two consecutive slots shall be in phase in the direction $\theta_0$ (here $\theta_0$=30°, with i=45° and an axis at +15°), the phase-shift between them should be 2hπ in this direction (h=1, 2, 3, etc.).

Ultimately then, bearing in mind that a dielectric is used, it is easy to determine for each slot what are the optimum radiating conditions, to align the radio beam in a predetermined direction in the steady state, and finally to find d (distance between the mutually opposite edges of two consecutive slots in one and the same waveguide) a value which is such as to leave sufficient space between the two radiators to be able to interpose one of the phase-shift elements $D_1^1$ to $D_3^3$.

In addition, the right section of the waveguide can be reduced appreciably (in the ratio of $1/\sqrt{\epsilon}$).

For practical reasons, in this second embodiment of the antenna in accordance with the invention, d will preferably be given a value in the order of 0.7λ and a dielectric filler will be used for which ε is approximately 10, this in order to be able to use a rectangular waveguide in which the large side a of the right section is in the order of 5 cm. or less.

Thus, in the case where slots are used which are arranged in the manner shown in FIG. 6c, the equation linking their spacing d, the steady state sweep or offset angle $\theta_0$, the relative permittivity ε, the wavelength and the whole number h, is $$d = (h - 0.5) \frac{\lambda}{\sqrt{\epsilon} \cos \phi + \sin \theta_0}$$

Taking the example in which d=0.75λ and $\theta_0$=30°, we can make h=3 and φ=30° so that the dielectric will have the permittivity ε of 10.4, the dimension a will be reduced to 5.75 cm. and the spacing d, measured in terms of wavelengths λz in the waveguide, is d=2.05λz.

However, it is possible to use other values (we could make h=2 for example) and to arrange the slots in the manner shown in FIG. 6b.

Figure 5:
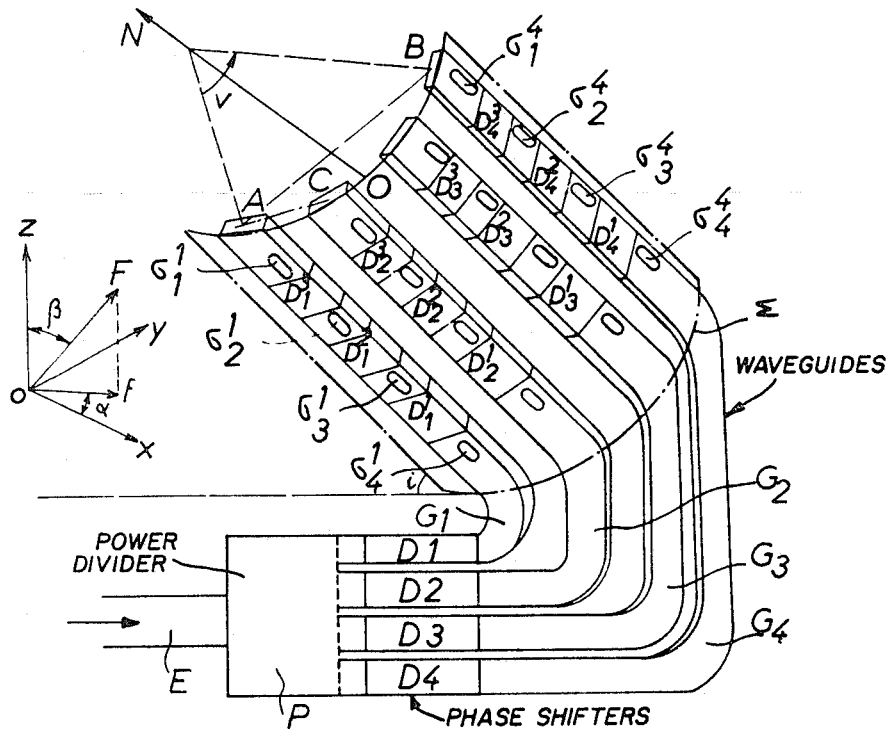

In order to be able to deflect the different radio beams both in azimuth and in elevation, the invention provides for the use of digital phase-shift elements of diode type, which are interposed between the radiators, i.e. are located inside the waveguide (FIG. 5).

The purpose of using phase-shift elements of this kind in the antenna is as follows:

They can operate properly throughout a wide temperature range of between −50° C. and +140° C. for example, which is indispensable if the antenna is located in an unpressurised part of a supersonic aircraft;

They are simple to manufacture and install, which means they are inexpensive;

There is separation between azimuth and elevation beam control functions;

Control is simple;

The phase-shift element has a reciprocal character, enabling the antenna to be used both for transmission and reception.

The value of the maximum phase-shift needed to deflect the beam in azimuth depends upon the curvature of the antenna (the waveguides are arranged to correspond to the generatrices of the surface Σ of a cylinder), and upon the number of waveguides.

Basing our discussion on four waveguides, the maximum value is 360°; therefore, "azimuth" phase-shift elements Da which can produce up to 360° phase-shift will be used. Considering four increments of phase-shift (digital phase-shift elements), this means an incremental step of less than 22.5°. Therefore, four phase-shift assemblies giving respective phase-shifts of 22.5°, 45°, 90° and 180° are employed.

For elevational attitude control, if the elementary radiators are basically phased in the direction $\theta_0$, a maximum phase-shift must be applied to them of $$\phi M = \frac{2\pi d}{\lambda} (\sin \theta_0 + \sin \theta_1)$$

in order to orientate the beam in the direction $\theta_1$ which corresponds to the maximum sweep or offset $\theta_0 + \theta_1$.

If we have d=0.75λ, $\theta_0$=30°, $\theta_1$=35°, φM=288°, then this phase-shift can be produced using four phase-shift assemblies giving 19°, 38°, 76°, and 152° phase-shift approximately.

If the internal d is less (d=0.6λ for example), the precision of sweep may merely require the use of three phase-shift assemblies.

Each phase-shift element is designed to exploit the variation in impedance produced by the inclusion of a rod in a waveguide, the variation depending upon whether or not a capacitance is placed in series with the rod. This capacitance is created by blocking a diode in its non-conductive state (reverse operation). When the diode is in its conductive state (forward operation), it has no effect at all and the rod acts in the normal manner.

In the electrical sense, these two states are characterized by the equivalent circuit diagrams shown in FIGS. 7a and 7b, which relates to a line of length l.

The transition, from the conductive condition to the non-conductive condition, is controlled by means of an electrical bias line which runs parallel to the guide and modifies the potential of the diode associated with each rod.

The antenna which has just been described has numerous advantages. In particular, each waveguide, $G_1$ to $G_4$, can be fed by a separate power amplifier. This means that for a total radiated power P, $m$ amplifiers having powers of $P/m$ can be used. The reliability of this system is thereby improved and the introduction of transistorised transmitters is made much easier. The phase-shift elements $D_1$, $D_2$, $D_3$, $D_4$ of FIG. 5 can be replaced by phase control of the transmitters in the manner shown in FIG. 8, wherein the reference 10 denotes a pilot transmitter, 11 the assembly controlling the phases of the transmitters I, II, III and IV, these being the individual transmitters supplying radio frequency power to each of the waveguides $G_1$, $G_2$, $G_3$ and $G_4$.

Thus, there is now only a single type of phase-shift element D between the radiators.

The use of a dielectric in the waveguide enables the dimension $a$ to be reduced to a valve close to $\lambda/4$. However, the longitudinal axes of the two consecutive waveguides are at least $\lambda/2$, which permits a maximum azimuthal sweep of 90° in the beam. Thus, between two waveguides of antenna $B_1$ or $T_1$, there is the requisite space to accommodate a waveguide antenna $B_2$ or $T_2$, as the case may be, the waveguides of the two antennas being interlaced and the area of the radome, behind which the antennas are housed, being reduced by half.

This enables the antenna gain to be boosted for the same radome area.

In accordance with a third embodiment of the invention, the various elementary radiators, each grouped on the panels $B_1$ and $B_2$, on the one hand, or $T_1$ and $T_2$, on the other, and constituting the two lateral antenna arrays, are arranged on joint panels with a surface section of double curvature the design of which may be effected either by calculation or experiment. Certain simple considerations have directed that the choice should fall upon a surface which is part of a torus, the concave face preferably being used. Due to this choice, it is possible to give any desired degree of "convergence" to the directions of principal radiation of the elementary radiators situated in the $n$ rows, by virtue of the value given to the radius R of gyration of the torus, and also any desired degree of convergence in the radiation fractions produced by the $n$ radiators situated in the $m$ columns of the grid arrangement, this time by virtue of the choice of the value of the radius $r$ of the generatrix circle of the torus.

Self-evidently, other surface shapes could be used without departing from the scope of the invention, either surfaces of equal curvature such as the sphere, or surfaces of double curvature. In particular, the ellipsoid, developable surfaces of revolution, developable or non-developable surfaces following various laws, and "channel" surfaces, are useful.

Thus far, it has been assumed that:

(a) The separate radiators on one and the same panel are situated on straight lines or orthogonal curves traced on the surfaces of such panel;

(b) The radiators are disposed equidistantly along such straight lines or curves.

These assumptions simplify the above discussion of the invention, but are not in any way intended as a restriction of its scope.

FIGS. 9a to 9c are diagrams which are designed to illustrate the non-convergence or convergence of the principal directions of radiation of the different elementary radiators, all in accordance with the shape of the surface of the panel carrying them; FIG. 9a shows a flat surface, FIG. 9b a portion of a cylinder, and FIG. 9c a portion P of circular toroidal form.

The antenna obtained with this third embodiment of the invention has the following advantages:

(a) The shape of the surface carrying the elementary radiators makes it possible to use, for these latter, sources which are inherently more directional (the apertural angle of the elementary beam at half-power being 120° or 90° for example). This still further substantially increases the possibilities of deflection of the composite beam produced by the assembly of sources, e.g. 70° in azimuth, and 40° in elevation, and simplifies the manufacture of the elementary radiators whilst improving their performance;

(b) By directing the radiators towards the concave side of the surface, the proportionate reduction in the dimensions of the radome shrouding the radiators can be made very substantial;

(c) Finally, since the elementary radiators have a narrower beam, any method of producing phase-shift can be used and in particular a method which consists of rotating the radiator itself about its own axis of radiation, using small servomotors.

Since each sub-array B or T is arranged on one plane, or for that matter on any single surface, the phases of each of the radiators must be variable in order to ensure correct alignment of the beams of each lateral antenna, and this is effected using "phase-shift elements" or "any known means which can be utilised for the purpose."

We will confine ourselves here to a description of a section of a sub-array ($B_1$ or $B_2$ for example) and from this it will be seen how $B_1$ and $B_2$, or $T_1$ and $T_2$ for that matter, can be developed in the same way.

It has already been mentioned that the mean inclination of the surface carrying the radiators, in relation to the horizontal plane of the aircraft, should be around 45°. The consequence of this is to limit the field of sweep of the beam to ±40° in elevation, which yields a total elevational range of coverage from +5° to +90° at both sides of the aircraft.

However, in order to obtain complete azimuthal coverage, theoretical sweeps of ±90° should be possible. If this range is reduced to ±70° it will still satisfy practically all requirements of aerial navigation: however, the difference between the sweep ranges in azimuth (±70°) and in elevation (±40°), implicitly means that in the design of the dual lateral antennas there will be "special designing" of the radiators in the $n$ rows and $m$ columns.

It is well known, in fact, that it is extremely difficult to obtain sweeps of much above 50° without sacrificing considerable antenna gain, this because of:

The directional nature of the elementary radiators (a beam angle of 150°, or ±75°, at half-power is difficult to achieve and produces a 3 decible loss for a sweep of 75°);

The effective area S over which the radiators are distributed varies as its orthogonal projection or, in the case of a flat surface, as $\cos \theta$:

$$S = S_0 \cos \theta$$

The fall-off in antenna gain thus varies as $10 \log \cos \theta$.

In order to avoid these drops in gain with large sweep, and also to permit the use of radiators having a narrower beam, it is arranged, in accordance with the third embodiment of the invention, for the positioning of the radiators on surfaces which have different curvatures in the azimuthal and elevational planes of scanning, the sphere being considered a special case.

The horizontal plane A of FIG. 10 corresponds to a plane of the aircraft which is inclined at around 45° to the aircraft horizontal plane.

The radiators are assumed to be radiating towards the concave side of their supporting surface, and are indicated by small circles (6 in the plane A, 5 on a generatrix line).

The plane A is the plane of azimuthal sweep, and the plane B is that of elevational sweep. The plane $yOz$, parallel to the plane B, is perpendicular to the longitudinal axis of the aircraft (fuselage axis).

In order to assess the advantage obtained by an arrangement of this kind, the radiation patterns have been plotted which are obtained when the radiators are:

On a flat surface, spaced at intervals of $d=0.7\lambda$;

On a portion of a torus such as indicated in FIGS. 9c and 10, where $r=2.1\lambda$ is the radius of the generatrix circle and $R=2r$ (a closed torus). The spacing between the radiators is such that two neighbouring meridians are 15° away from one another (angle $a=15°$) and that two radiators on one and same meridian are 10° away from one another (angle $b=10°$).

The radiation patterns were plotted for 25 radiators fed at constant amplitude throughout, this corresponding to 5 radiators per meridian and 5 meridians.

Three cases were selected;

$$e_k(u) = e_k \cos ku \text{ in V}/m$$

$k=0.60$: an elementary radiator producing a beam angle of 150° at half-power;
$k=0.75$: 120° beam angle at half-power;
$k=1$: 90° beam angle at half-power.

Each radiator is designated by an index $i$ and the direction of radiation by an index $j$, and bearing this in mind it will be understood that the shape of the radiation pattern of the antenna is given by:

$$E_j^2 = [\epsilon_i e_k \cos k u_{ij} \cos \phi_{ij}^2] + [\epsilon_i e_k \cos k u_{ij} \sin \phi_{ij}^2]$$

where $u_{ij}$ is the angle made between the axis of the radiator and the direction $j$, and $\phi_{ij}$ is the apparent phase of the source $i$ for the direction $j$.

By plotting $10 \log_{10} E_j^2$ for the directions $j$ which are at increments of 3° for example, the shape of the radiation pattern is obtained.

These patterns indicate that the level of the secondary lobes is better when using the flat supporting surface, for small sweep angles, but it is satisfactory in the case of the toroidal supporting surface, especially in the plane $yOz$ (dealing with elevation). The conclusion is that the toroidal supporting surface has little adverse effect upon the radiation pattern for small angles of sweep, when compared with a flat supporting surface.

If we trace the 12 diagrams corresponding to a large sweep, for example −65° in azimuth and 0° in elevation, the curves being plotted in the plane $xOy$ and the meridian plane −65°, it is seen that the toroidal supporting surface greatly facilitates the achievement of a sweep of −65°, even in the case where the elementary radiator has a beam angle of 90° at half power ($k=1$). The 12 diagrams or patterns referred to hereinbefore correspond to 6 patterns, in the case where the surface carrying the radiators is a flat one (the patterns in the plane $xOy$ and the meridian −65°, for the three $k$ values hereinbefore listed) and to 6 patterns in the case where the said surface is a toroidal one.

Calculations of absolute gain will indicate that the gains obtained with the toroidal surface are in all cases higher with large azimuthal sweep of the beam than those obtained with the flat surface. The difference is the more marked the narrower is the beam produced by the elementary radiator.

The improvement effected by using surfaces with curvature (or double curvature) to support the radiators, can be still further enhanced by switching the sets of radiators arranged on the extreme meridians.

In FIG. 11, seven radiators are shown on the generatrix circle of radius $r=2.85\lambda$ ($\lambda$ being the operating wavelength), in the plane A hereinbefore defined; these radiators are at angular intervals of 12° ($a=12°$) and each radiator is representative of the 5 placed on the corresponding meridian and spaced at intervals of 7° ($b=7°$) (see FIG. 10). Of these 7 radiators, only 5 are operative simultaneously. Sources 1, 2, 3, 4 and 5 are provided (see FIG. 11). This situation prevails as long as the antenna beam is orientated towards the positive meridians (between 0° and +90°, as indicated by the arrow $fp$ in FIG. 11); on the other hand, as soon as the beam is orientated towards the negative meridians (as indicated by the arrow $\vec{fn}$ in FIG. 11), a switching operation is carried out from source 1 to source 7 and from source 2 to source 6.

This kind of switching operation enables the efficiency, i.e. the gain, to be improved by about 2 decibels for large sweeps, the number of radiators in the plane A having been reduced from 7 to 5.

This switching operation implies the idea of using sets of radiators on the meridians, which are supplied with different power fractions all in accordance with the angle of sweep of the beam. Provision for this possibility is envisaged by using some method of not feeding the radiators with equal amplitudes, in particular using the following methods:

Switches and several power-dividers, referred to generally by 10 in FIG. 11, where power division is by a factor of 5;

A network of hybrid junctions, of the "Butler matrix" type, plus phase-shift elements. A Butler matrix is described in "Multiple Beam Antenna" by J. Butler, Sanders Associates, Inc., Nashua, N.H., Internal Memorandum RF 3849, January 1960, as well as in "IRE Transactions on Military Electronics 1962—An RF Multiple Beam-Forming Technique" by W. P. Delaney.

For example, in the case of 7 sets of radiators, the amplitudes supplied to each one will be proportional to the following figures, which have been given by way of example:

| | |
|---|---|
| Number of radiator | 1 2 3 4 5 6 7 |
| Amplitude at the radiator (small sweeps of ±40°) | 1 2 4 4 4 2 1 |
| Amplitude at the radiator (large sweeps of +40° to +90°) | 4 4 3 2 1 0 0 |

In the same way as in the two antenna embodiments already described, the phase shift $\phi_i$ to be given to the radiator $S_i$, in order that the beam from this antenna is orientated in the direction $j$, can be achieved by using any known kind of phase-shift element (digital or analogue phase-shift element, using diodes or ferrite elements for example). However, it is equally possible as shown on FIG. 14 to rotate $S_i$ through an angle $\phi_i$ about its own axis of radiation 19 which is normal to the surface (S), this surface being that of the panel 20 carrying the source $S_i$ in question. For this purpose, small servomotors 21 can be used, the position of whose rotor 22, being electrically controlled from 23, determines the magnitude of the angle $\phi_i$ through which $S_i$ should turn. The use of these motors, which can operate satisfactorily throughout a wide temperature range (−55° C. to +230° C. for example) enables continuous and accurate phase shift to be effected, ensuring high precision in control of the orientation of the antenna beam whatever the ambient temperature.

The source $S_i$ can be represented by two vectors $\vec{p_i}$ and $\vec{q_i}$ which are practically identical and are in quadrature (circularly polarised source or radiator), $\vec{q_i}$ being delayed by $\pi/2$ in relation to $p_i$. The reference datum of these vectors, from which $\phi_i$ is counted, is such that $\vec{p_i}$ is tangential to a parallel to the surface (S) on which the radiator $S_i$ is situated, whilst $\vec{q_i}$ is tangential to the meridian at this point.

The concept of the sub-array ($B_1$ or $B_2$) as it has been described here, enhances the selection available in terms of type of radiating source which can be used (dipoles, slots, spirals, helices, etc.). It enables the sub-array $B_2$ to be built up in accordance with two methods:

The first employs the same radiating sources, the frequencies of transmission and reception in the case of $B_2$ differing from those applicable in the case of $B_1$, but in both instances falling within the band of between 1540 and 1660 mc./s. The phase $\phi'_i$ for producing sweep in the beam of $B_2$ is achieved by a second phase-shift element and a circuit of the kind shown in FIG. 12. In this case, of course, the principle of rotation referred to hereinbefore cannot be resorted to, since one and the same rotation cannot of course simultaneously produce $\phi_i$ and $\phi'_i$. The diagram of FIG. 12, in which mutually opposite polarisations are produced in the beams of $B_1$ and $B_2$, provides sufficient isolation between the beams to prevent interference. It also ensures that there is no possibility of the same sets of sources in $B_1$ and $B_2$, being supplied.

In this diagram, 31 designates a phase-shift element $i$ for feeding a source or radiator designed to form the beam which co-operates with satellite $S_1$, and 32 designates a similar phase-shift element for feeding the same radiator for the beam co-operating with the satellite $S_2$ (the panels $B_1$ and $B_2$ are merged, since the same radiators are being used). These phase-shift elements are connected to a hybrid junction 33 which, on the one hand, provides the two vectors $$\vec{p}_i(t) \text{ and } \vec{q}_i\left(t-\frac{\pi}{2}\right)$$

and, on the other hand, the vectors $$\vec{p}_i'\left(t-\frac{\pi}{2}\right) \text{ and } \vec{q}_i'(t)$$

which are required to produce the two circular polarisations of opposite direction, in the two transmitted or received beams.

The second method consists in using different radiators for $B_1$ and $B_2$, which radiators are, however, overlapped, the radiators $S'_i$ of $B_2$ being located between those $S_i$ of $B_1$ in a manner similar to that shown in FIG. 13, where it has been assumed that each radiator occupies a circular zone of $0.4\lambda$ and is separated from its neighbours by a distance of $0.65\lambda$.

The particular phases at each radiator can then be produced by any known means, including the use of servomotors. The directions of polarisation can again be opposite to one another.

It will be appreciated that the above-described embodiments are merely examples and can be modified in various ways within the scope of the invention, as defined by the appended claims.

What is claimed is:

1. A radio-determination system fitted aboard an aircraft and designed to operate for aerial navigation with reference to two earth satellites used as radio-beacons, comprising an antenna array having a plurality of elemental radiators located on a curved revolution surface portion admitting parallels and meridians and whose means tangential plane is inclined at 45° with the longitudinal plane of said aircraft, said array being subdivided into two identical sections for radio beam transmission towards said satellites and radio beam reception therefrom, each section incorporating a number $Q = m \times n$ of said elemental radiators arranged in $m$ rows of $n$ radiators each, distributed on $m$ angularly equidistant meridians of said curved surface, and means for selectively switching the outermost rows of radiators positioned on the extreme meridians in accordance with the radio beam direction.

2. System as claimed in claim 1, wherein the elemental radiators of each of said array sections are further distributed on $n$ rows along $n$ parallels of said curved surface, said system further comprising means for supplying the elemental radiators pertaining to one and the same row with different power fractions, through the medium of a Butler matrix.

3. System as claimed in claim 1, wherein the elemental radiators of each of said array sections are further distributed on $n$ rows along $n$ parallels of said curved surface, said system further comprising means including switches and power dividers for supplying the elemental radiators pertaining to one and the same row.

4. System as claimed in claim 1, further comprising miniature servomotors having rotors connected to respective elemental radiators for rotating the same about the axis thereof thereby orientating the radio beams for scanning purpose, and electric control means for angularly positioning said servomotor rotors thereby determining the rotation angle of the respective elemental radiators.

5. System as claimed in claim 1, wherein said $m$ rows of elemental radiators extending on $m$ angularly equidistant meridians of said curved surface, consist of $m$ rectangular section waveguides with $n$ radiating slots each, said system further comprising a dielectric material of dielectric constant equal to about 10 filling said waveguides, and "rod" type phase-shift elements inserted between such radiating slots.

6. System as claimed in claim 5, wherein said radiating slots are inclined relatively to the longitudinal axis of the respective waveguides, the size, spacing and relative inclination of said radiating slots being so determined as to produce circular or elliptical polarization.

7. System as claimed in claim 5, further comprising a separate amplifier and phase controlled transmitter for the supply of each of said waveguides.

References Cited

UNITED STATES PATENTS

| | | | |
|---|---|---|---|
| 2,227,563 | 1/1941 | Werndl | 343—758 |
| 2,425,303 | 8/1947 | Carter | 343—705 |
| 3,095,538 | 6/1963 | Silberstein | 343—100 |
| 3,141,167 | 7/1964 | Sandretto | 343—100 |
| 3,209,357 | 9/1965 | Wyatt | 343—100 |
| 3,307,188 | 2/1967 | Marchetti et al. | 343—100.6 |
| 3,308,467 | 3/1967 | Morrison, Jr. | 343—705 |
| 3,386,092 | 5/1968 | Hyltin | 343—100.6X |

RODNEY D. BENNETT, JR., Primary Examiner

J. G. BAXTER, Assistant Examiner

U.S. Cl. X.R.

343—705, 758, 771, 777, 824, 854